United States Patent [19]

Yabe

[11] Patent Number: 4,762,971

[45] Date of Patent: Aug. 9, 1988

[54] SPRING-TYPE OPERATING MECHANISM FOR A CIRCUIT INTERRUPTER

[75] Inventor: Kiyoshi Yabe, Itami, Japan

[73] Assignee: Mitsubishi Denki Kabushiki Kaisha, Japan

[21] Appl. No.: 20,171

[22] Filed: Feb. 27, 1987

Related U.S. Application Data

[63] Continuation of Ser. No. 784,037, Oct. 4, 1985, abandoned.

[51] Int. Cl.⁴ .............................................. H01H 3/30
[52] U.S. Cl. ..................................... 200/153 SC; 74/2
[58] Field of Search ............. 200/153 SC; 188/82.84; 74/577 R, 577 S, 577 M, 2; 185/40 R; 254/376

[56] References Cited

U.S. PATENT DOCUMENTS

| | | | |
|---|---|---|---|
| 3,059,500 | 10/1962 | Schneiter | 188/82.74 |
| 3,542,160 | 11/1970 | Sacchini | 188/82.84 |
| 3,600,540 | 8/1971 | Bould | 200/153 SC |
| 3,689,720 | 9/1972 | Patel | 200/153 SC |
| 3,689,721 | 9/1972 | McGuffie | 200/153 SC |
| 3,773,995 | 11/1973 | Davies | 200/153 SC |
| 4,039,058 | 8/1977 | Trzebiatowski | 188/82.84 |
| 4,163,133 | 7/1979 | Bould | 200/153 SC |
| 4,240,300 | 12/1980 | Tanaka | 74/2 |
| 4,578,551 | 3/1986 | Lin | 200/153 SC |

FOREIGN PATENT DOCUMENTS

347171  2/1905  France ........................... 188/82.84

*Primary Examiner*—Henry J. Recla
*Assistant Examiner*—Linda J. Sholl
*Attorney, Agent, or Firm*—Leydig, Voit & Mayer

[57] ABSTRACT

In a spring operating mechanism for a circuit interrupter the rotational force of an electric motor rotates a ratchet wheel securely mounted to a main shaft to charge the closing spring, the ratchet wheel having a pawl to hold the ratchet wheel and main shaft in open and closed positions against the force of the closing spring, and energy of the closing spring is used for the closing and tripping of the circuit interrupter. The main shaft is provided with a one-way rotary clutch which allows rotation of the ratchet wheel and main shaft in a first direction and prevents rotation in the opposite direction to reduce the impact force engagement between the pawl and the ratchet teeth at the end of the closing operation as the ratchet wheel and shaft reach the closed position.

2 Claims, 5 Drawing Sheets

SPRING-TYPE OPERATING MECHANISM FOR A CIRCUIT INTERRUPTER

This application is a continuation of application Ser. No. 784,037, filed Oct. 4, 1985, now abandoned.

FIELD OF THE INVENTION

This invention relates to a spring-type operating mechanism for a circuit interrupter in which the rotational force of an electric motor charges a spring and the charged spring energy is used to close and open the circuit interrupter, and particularly to the improvements thereof.

One example of a conventional spring-type operating mechanism for a circuit interrupter is shown in FIGS. 1 to 4. A lever 3 is rotatably mounted on a pin 2 supported by a frame 1, and a pin 4 on one end of the lever 3 is connected to an unillustrated interrupting unit and is biased in the direction of the arrow a by means of an unillustrated opening spring. A groove 5 is formed in the other end of the lever 3 and a roller 6 is rotatably mounted within the groove 5 on a pin 7. Also, a pin 8 is rotatably supported by the lever 3 within the groove 5 so that it engages a latch 10 rotatably supported by the frame 1 through a pin 9 to prevent the lever 3 from rotating counterclockwise in the figure in the direction of the arrow a about the pin 2 due to the biasing force. While the latch 10 is urged to rotate clockwise in the figure about the pin 9 due to a force from the pin 8, the latch 10 is prevented from doing so by contact with a trigger 12 rotatably mounted on the frame 1 through a pin 11. Reference numerals 13 and 14 designate return springs of the latch 10 and the trigger 12, respectively. The end of the trigger 12 opposite from the end which engages the latch 10 abuts against a plunger 15 which moves to the right in the figure when a trip electromagnet 16 is energized. The frame 1 also rotatably supports a main shaft 17 on which a cam 18 is secured.

As shown in FIG. 3, a ratchet wheel 19 is fixed on the main shaft 17. The ratchet wheel 19 has a groove 20 formed in its entire outer circumference as shown in FIG. 4, and teeth 21 provided on both sides of the groove 20 over about a half of the circumference as shown in FIG. 3. While the ratchet wheel 19 is urged to rotate in the counterclockwise direction as viewed in FIG. 3 by a closing spring 37 whose function will be explained later, its rotation is prevented by the engagement of a pin 22 rotatably mounted on the ratchet wheel 19 with a latch 24 rotatably mounted on the frame 1 by a pin 23. While the latch 24 is urged to rotate counterclockwise as viewed in FIG. 3 by the force applied to it through the pin 22, its rotation is prevented by engagement with a trigger 26 rotatably mounted on the frame 1 by a pin 25. The latch 24 and the trigger 26 are provided with return springs 27 and 28. The trigger 26 is adapted to abut against the end of a plunger 29 which moves to the right when the closing electromagnet 30 is energized. The frame 1 also rotatably supports an eccentric shaft 31 in the vicinity of the ratchet wheel 19. The eccentric shaft 31 is connected to an unillustrated electric motor. The eccentric shaft 31 has formed thereon two eccentric portions on which a smaller pawl 32 and a larger pawl 33 are rotatably mounted. The smaller and the larger pawls 32 and 33 engage the teeth 21 of the ratchet wheel 19 and rock as the eccentric shaft 31 rotates to cause the counterclockwise rotation of the ratchet wheel 19. On the ratchet wheel 19, one end of a spring rod 34 is rotatably mounted through a pin 35 and the other end of the spring rod 34 engages the spring holder 36. The spring holder 36 contacts one end of a closing spring 37 disposed within a spring guide 38 to receive the spring force in the state shown in FIG. 3. This spring force is transmitted to the main shaft 17 to rotate it counterclockwise.

As shown in FIG. 4 which is a sectional view taken along line IV—IV of FIG. 2, the main shaft 17 has fixedly mounted thereon the ratchet wheel 19 with a spacer 39 interposed between the ratchet wheel 19 and a portion of the frame 1. The main shaft 17 is further provided with a cam 18 interposed between. The main shaft 17 is rotatably supported by the frame 1 through bearings 44 and 45 disposed on fixed track rings 42 and 43.

The operation of the above-described apparatus will now be described, with an interrupting operation being first explained. In FIG. 2, when the trip electromagnet 16 is excited, the plunger 15 moves to the right in the figure and pushes the trigger 12, rotating it clockwise, thereby disengaging the trigger 12. Then the latch 10 rotates clockwise and disengages from the pin 8. Therefore, the lever 3 is rotated counterclockwise by the spring force in the direction of the arrow a and opens the unillustrated interrupting unit connected to the pin 4. In this case, since the main shaft 17 does not rotate, the portion illustrated in FIG. 3 is not operated and remains in the illustrated position during the interruption. FIG. 5 shows the state of the parts shown in FIG. 2 after the completion of the interrupting operation.

Next, the closing operation will be described. Referring to FIG. 3, when the closing electromagnet 30 is excited, the plunger 29 moves to the right in the figure and abuts against the trigger 26, causing it to rotate in the clockwise direction, so that the engagement between the trigger 26 and the latch 24 is released and the latch 24 is rotated counterclockwise and disengages the latch 24 from the pin 22. This causes the ratchet wheel 19 together with the main shaft 17 to be rotated counterclockwise by the spring force of the closing spring 37. The rotation of the main shaft 17 causes the cam 18 to rotate counterclockwise, and as the cam 18 rotates counterclockwise from the position shown in FIG. 5, the roller 6 rolls on the cam surface of the cam 18 and rotates the lever 3 clockwise, whereby the unillustrated interrupting unit connected to the pin 4 is closed and the unillustrated trip spring is charged. When the lever 3 is rotated clockwise to the position shown in FIG. 6, the latch 10 and the trigger 12 return due to the return springs 13 and 14, and the latch 10 engages the pin 8, so that even when the cam 18 further rotates and the roller 6 is separated from the cam surface, the rotation of the lever 3 in the counterclockwise direction due to the spring force in the direction of the arrow a of the trip spring is prevented and the closed position is maintained.

On the other hand, as shown in FIG. 7, the main shaft 17 is rotated counterclockwise (in a first direction) by the spring force of the closing spring 37 applied through the spring holder 36, the spring rod 34 and the ratchet wheel 19 until the closing spring 37 reaches the most expanded state of the closing spring. The main shaft 17 continues to rotate past the dead center position a short distance due to the rotational energy in the main shaft 17, the cam 18, and the ratchet wheel 19 provided by the closing spring 37 while charging (compressing) the closing spring 37, and after stopping momentarily, the main shaft 17 starts rotating clockwise (in the opposite direction) by the closing spring force until it is stopped by the engagement of the teeth 21 of the rachet wheel 19 with the tips of the smaller pawl 32 and the larger pawl 33. FIG. 6 illustrates the state of the portion shown in FIG. 5 after the closing operation has been completed, and FIG. 7 illustrates the state of the portion shown in FIG. 3.

Next, the closing spring charging operation will be described. When the eccentric shaft 31 is rotated by the unillustrated electric motor from the state shown in FIG. 7 in which the tips of the smaller pawl 32 and the larger pawl 33 engage the teeth 21 of the ratchet wheel 19, the tips of the smaller pawl 32 and the larger pawl 33 effect rocking motions, thereby pushing the teeth 21 to rotate the ratchet wheel 19 counterclockwise. As the ratchet wheel 19 rotates the main shaft 17 rotates and the closing spring 37 is charged (compressed). When the ratchet wheel 19 is rotated close to the position shown in FIG. 3, the latch 24 and the trigger 26 are returned to their original position due to the return springs 27 and 28, and when the ratchet wheel 19 is rotated counterclockwise beyond the state in which the spring is most compressed by the closing spring 37, the pin 22 on the ratchet wheel 19 engages the latch 24 to maintain the charged condition of the closing spring previously described and shown in FIG. 3.

In such a conventional spring-type operating mechanism, at the end of the closing operation, when the direction of rotation of the ratchet wheel 19 reverses and it rotates clockwise after rotating counterclockwise beyond the dead center position and stopping momentarily, the teeth 21 of the ratchet wheel 19 engage with the smaller and the larger pawls 32 and 33, and these pawls are subjected to an impulse. Therefore, the teeth 21 of the ratchet wheel 19 and the tips of the smaller pawl 32 and the larger pawls 33 may be damaged in such a manner that the charging of the closing spring cannot be effected. Therefore, the conventional design has a drawback that the mechanism has a low reliability.

In a high-speed reclosing circuit interrupter, it is necessary to have a function by which the interrupter can be reclosed within a short time (generally about 0.3 seconds) after the tripping operation, and a function by which the interrupter can be tripped immediately after reclosing. In order to provide these functions, a typical high-speed reclosing circuit interrupter has a mechanism including two separate springs for closing and for tripping to concurrently actuate the circuit interrupter to close the interrupter and to charge the tripping spring upon the reclosing operation. The present invention relates to a high-speed reclosing circuit interrupter having such mechanisms.

Also, upon current interruption, the circuit interrupter must be rapidly driven and a massive surge of energy is necessary for tripping. Therefore, in a mechanism in which the trip spring is charged during the closing operation, the energy charged in the closing spring must be larger than the energy charged in the trip spring, making the closing spring charging mechanism an important point in the operating mechanism.

SUMMARY OF THE INVENTION

Accordingly, an object of the present invention is to provide a reliable spring-type operating mechanism for a circuit interrupter.

Another object of the present invention is to provide a spring-type operating mechanism for a circuit interrupter in which damage to the teeth or pawls is reduced and the reliability of the mechanism is increased.

With the above object in view, the present invention resides in a spring operating mechanism for a circuit interrupter in which a rotational force of an electric motor rocks a pawl to rotate a ratchet wheel securely mounted on a main shaft to charge the closing spring, and the charged energy of the closing spring is used for the closing and tripping of the circuit interrupter, characterized in that the main shaft is provided with a one-way rotary clutch.

BRIEF DESCRIPTION OF THE DRAWINGS

The invention will become more readily apparent from the following detailed description of a preferred embodiment of the present invention taken in conjunction with the accompanying drawings, in which.

PREFERRED EMBODIMENT OF THE INVENTION

Figure 1:
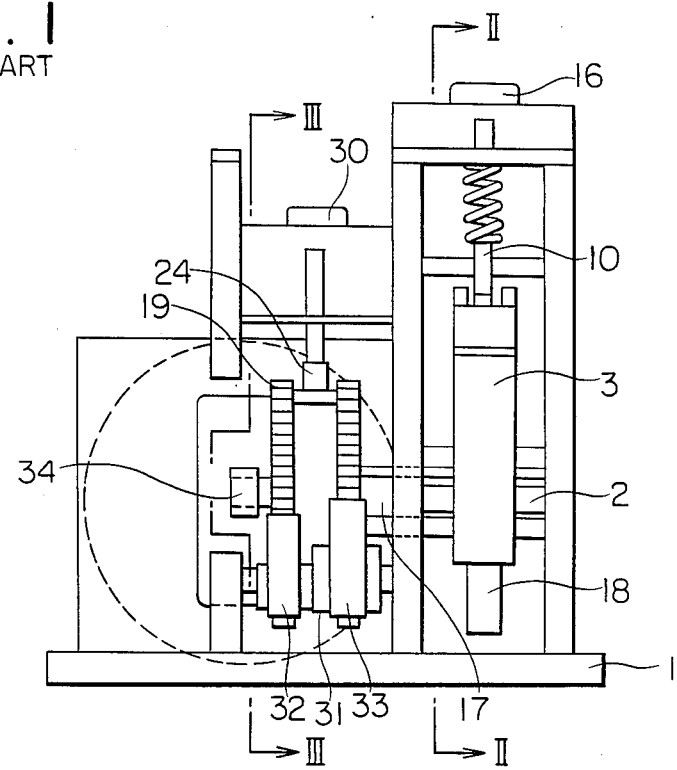
FIG. 1 is a front view of one example of a conventional spring-type operating mechanism for a circuit interrupter in a interrupter closed state.
Figure 2:
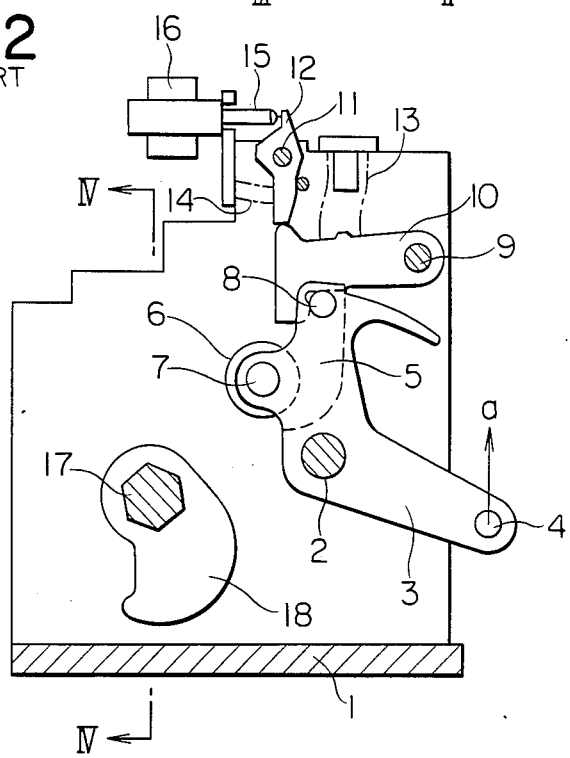
FIG. 2 is a sectional view taken in the plane of line II—II of FIG. 1.
Figure 3:
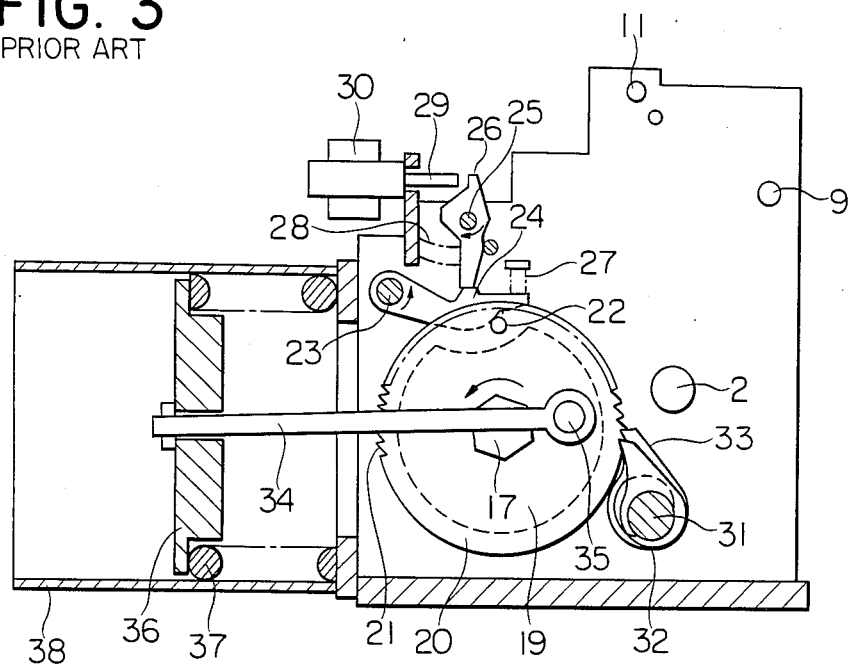
FIG. 3 is a sectional view taken in the plane of line III—III of FIG. 1.
Figure 4:
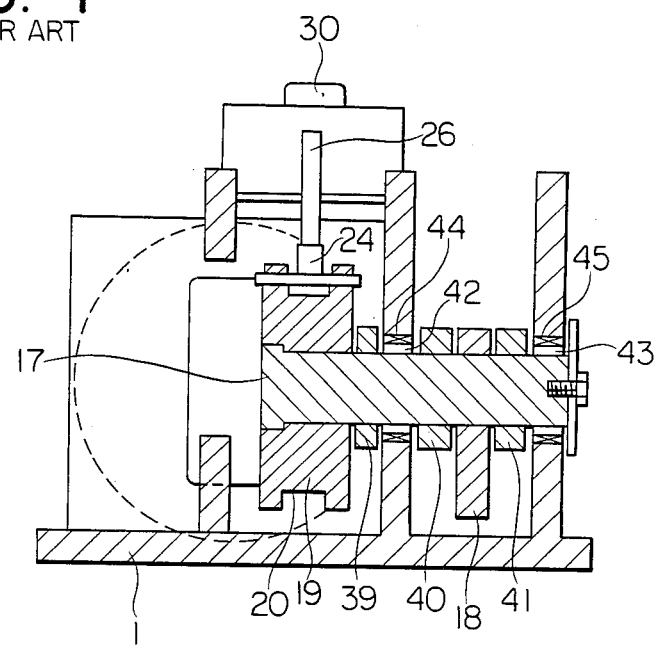
FIG. 4 is a sectional view taken in the plane of line IV—IV of FIG. 2.
Figure 5:
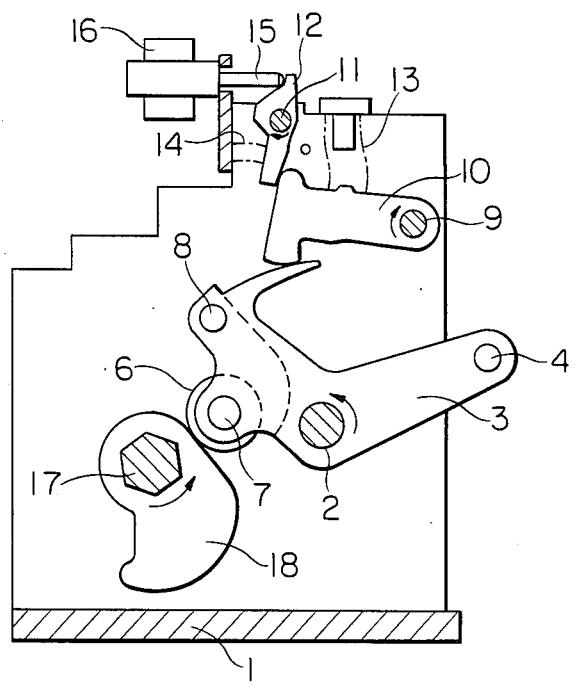
FIG. 5 is a sectional view similar to FIG. 2 but showing the state in which the interrupting operation has been completed.
Figure 6:
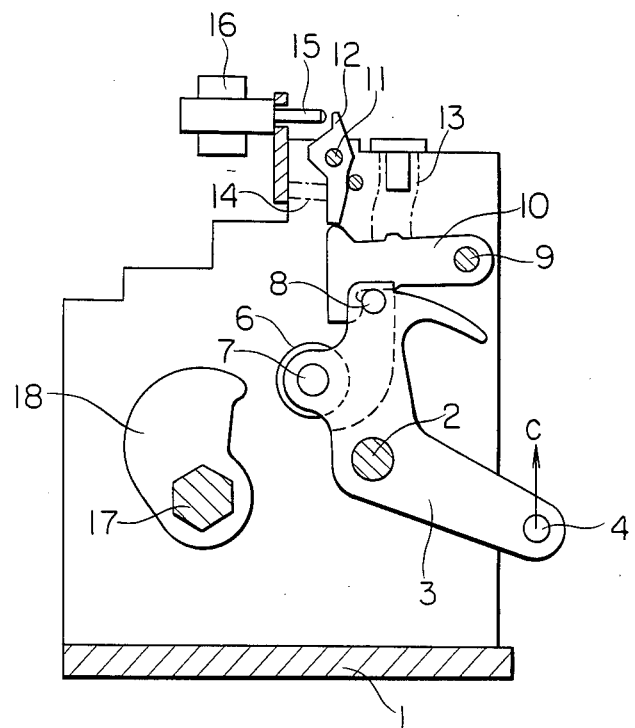
FIG. 6 is a sectional view similar to FIG. 5 but showing the state in which the closing operation has been completed.
Figure 7:
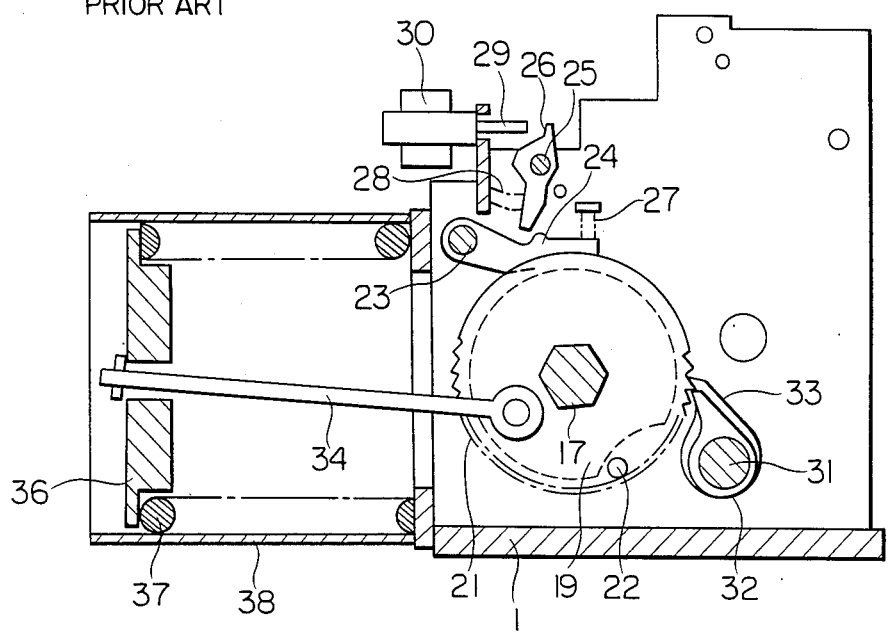
FIG. 7 is a sectional view similar to FIG. 3 but illustrating the state in which the closing operation has been completed.
Figure 8:
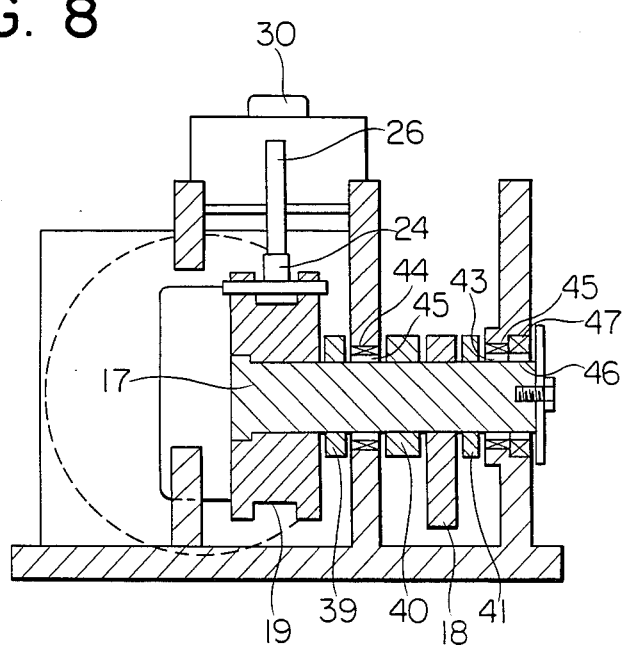
FIG. 8 is a sectional view similar to FIG. 4 but illustrating one embodiment of the spring-type operating mechanism for a circuit interrupter of the present invention.
Figure 9:
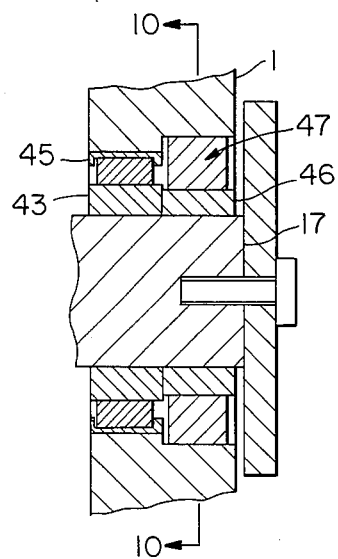
FIGS. 9 and 10 are fragmentary cross sectional views showing details of the one-way clutch, shaft and frame.
Figure 10:
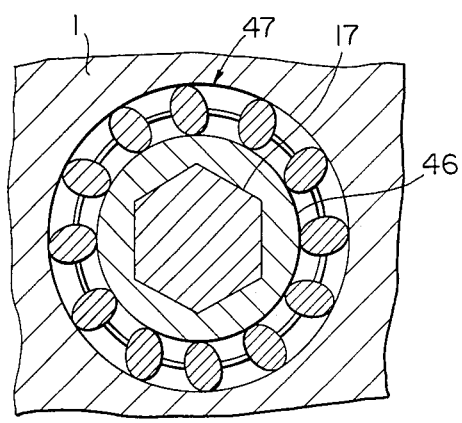

FIG. 8 which shows an embodiment of the present invention is a sectional view similar to FIG. 4. According to the present invention, the main shaft 17 has secured thereon a track ring 46 which is coupled with a one-way rotary clutch (commonly referred to by a trade name such as Cam Clutch or One-Way Clutch) mounted on the frame 1, as shown in FIGS. 9 and 10, and the main shaft 17 is allowed to rotate only in the counterclockwise direction as viewed in FIGS. 2 and 3 and is braked and prevented by means of the clutch from rotating in the clockwise direction. In other respects, the structure of the spring-type operating mechanism of the present invention is the same as that of the conventional mechanism illustrated in FIGS. 1 to 7.

Since the operation is also similar to that of the conventional mechanism except for the final stage of the closing operation, a description will be made only in connection with the final stage of the closing operation. In FIGS. 3, 7 8-10, as in the case of the conventional design, the main shaft 17 continues to rotate counterclockwise due to the spring force of the closing spring even after the shaft reaches the most expanded position of the closing spring 37 (the dead center position) and re-charges re-compresses the closing spring, and stops its rotation at a point past the dead center position when the energy is completely charged in the spring. The one-way clutch 47 allows rotation of the ratchet wheel 19 and the shaft 17 during the counterclockwise rotation produced by the closing spring. At the point when the counterclockwise rotation of the ratchet wheel 19 and the shaft 17 stops and the direction of rotation reverses and the main shaft 17 begins to rotate clockwise due to the spring force of the closing spring, this rotation is braked and prevented by the one-way rotary clutch 47. At this time, the ratchet wheel 19 tends to rotate clockwise by an amount corresponding to the amount of twist of the main shaft 17, but since the rotating torque is dissipated as deforming energy used for twisting the main shaft 17 as the shaft rotates, the impact force between the teeth 21 of the ratchet wheel 19 and the smaller and the larger pawls 32 and 33 can be significantly reduced when they engage.

As has been described, according to the present invention, by providing a one-way rotary clutch in the main shaft, an advantage is obtained that the impact force between the teeth of the ratchet wheel and the smaller and the larger pawls at the last stage of the closing operation can be reduced, so that a reliable spring-type operating mechanism is obtained.

What is claimed is:

1. A high-speed reclosing circuit interrupter comprising:
   a circuit interrupter unit;
   a frame;
   a main shaft rotatably supported on the frame;
   lever means connecting said main shaft to operate said circuit interrupter unit;
   a ratchet wheel mounted for rotation with said main shaft, said ratchet wheel having teeth over a portion of the circumference thereof;
   pawl means for engaging the teeth of said ratchet wheel to rotate said ratchet wheel and main shaft in a first direction and for holding said ratchet wheel and main shaft in open and closed positions spaced approximately 180 degrees apart;
   a closing spring connected to said ratchet wheel to be compressed in a charged condition as said ratchet wheel rotates in the first direction to the open position;
   latch means for holding said main shaft and lever means at an open position corresponding to an open position of said interrupter unit with said closing spring in the charged condition;
   means for releasing said latch means to allow said closing spring to expand and release charged energy upon a closing operation of the interrupter unit;
   means connecting said closing spring to rotate said ratchet wheel and main shaft in the first rotary direction and move said lever means from the open toward the closed position to carry out the closing operation when said closing spring expands, the rotation of said ratchet wheel and main shaft continuing in the first rotary direction to a point beyond the closed position where the direction of rotation momentarily reverses; and
   a one-way rotary engagement means operatively connected between said main shaft and said frame to allow rotation of said ratchet wheel and shaft in the first rotary direction and immediately operating to brake the shaft and thereby prevent reverse rotation of the shaft beyond momentary movement sufficient to engage the engagement means at the point when the direction of rotation reverses and before the ratchet teeth engage the pawl means to reduce impact force upon engagement between the pawl means and the ratchet teeth.

2. A high-speed reclosing circuit interrupter comprising:
   a circuit interrupter unit;
   a frame;
   a main shaft;
   lever means connecting said main shaft to operate said circuit interrupter unit;
   a bearing rotatably supporting said main shaft on said frame adjacent to and inward of an end of said main shaft;
   a ratchet wheel mounted for rotation with said main shaft, said ratchet wheel having teeth over a portion of the circumference thereof;
   pawl means for engaging the teeth of said ratchet wheel to rotate said ratchet wheel and main shaft in a first direction and for holding said ratchet wheel and main shaft in open and closed positions spaced approximately 180 degrees apart;
   a circuit interrupter closing spring connected to said ratchet wheel to be compressed in a charged condition as said ratchet wheel rotates in the first direction to the open position;
   latch means for holding said main shaft and lever means at an open position corresponding to an open position of said interrupter unit with said closing spring in the charged condition;
   means for releasing said latch means to allow said closing spring to expand and release charged energy upon a closing operation of the interrupter unit;
   means connecting said closing spring to rotate said ratchet wheel and main shaft in the first rotary direction and move said lever means from the open toward the closed position to carry out the closing operation when said closing spring expands, the rotation of said ratchet wheel and main shaft continuing in the first rotary direction to a point beyond the closed position where the direction of rotation momentarily reverses; and
   a one-way rotary engagement means operatively connected between said main shaft and said frame at the end of said main shaft adjacent said bearing to accurately align said rotary engagement means and shaft on said frame, said rotary engagement means allowing rotation of said ratchet wheel and shaft in the first rotary direction and immediately operating to brake the shaft and thereby prevent reverse rotation of the shaft beyond momentary movement sufficient to engage the engagement means at the point when the direction of rotation reverses and before the ratchet teeth engage the pawl means to reduce impact force upon engagement between the pawl means and the ratchet teeth.

* * * * *